United States Patent [19]

Shiraishi et al.

[11] Patent Number: 5,098,641
[45] Date of Patent: Mar. 24, 1992

[54] METHOD AND APPARATUS FOR MEASURING SUBCHANNEL VOIDS IN A LIGHT WATER REACTOR TEST FUEL ASSEMBLY

[75] Inventors: Leroy M. Shiraishi, San Jose; Donald A. Wilhelmson, Palo Alto; Bruce Matzner, San Jose, all of Calif.

[73] Assignee: General Electric Company, San Jose, Calif.

[21] Appl. No.: 625,176

[22] Filed: Dec. 10, 1990

[51] Int. Cl.$^5$ .......................................... G21C 17/038
[52] U.S. Cl. .................................. 376/245; 376/153; 376/450
[58] Field of Search ............... 376/245, 463, 256, 252, 376/153, 154, 155, 450; 364/933.8; 434/218

[56] References Cited

U.S. PATENT DOCUMENTS

| | | | |
|---|---|---|---|
| 3,350,564 | 10/1967 | Bonilla et al. | 250/106 |
| 3,376,200 | 4/1968 | Ward | 176/19 |
| 3,461,286 | 8/1969 | Jackson, Jr. et al. | 250/43.5 |
| 4,567,012 | 1/1986 | Radcliff | 376/245 |
| 4,645,635 | 2/1987 | Yuen et al. | 376/245 |
| 4,649,015 | 3/1987 | DeVolpi | 376/258 |

OTHER PUBLICATIONS

William T. Sha, "Neutron Beam Attenuation As An Out-Of-Pile Void Determination Technique & New Concept Of Shim Control For PWR", pp. 23-29, Jun. 8, 1964. (School of Engineering and Applied Science, Columbia University).

*Primary Examiner*—Brooks H. Hunt
*Assistant Examiner*—Chrisman D. Carroll
*Attorney, Agent, or Firm*—Robert R. Schroeder

[57] ABSTRACT

A light water nuclear reactor test assembly for emulating the performance of a nuclear boiling water reactor fuel bundle and measuring the subchannel void fraction in the two-phase region of the emulated fuel bundle by gamma ray attenuation is disclosed. The emulated fuel bundle has individual emulated nuclear fuel rods typically heated by individual electrical currents instead of nuclear reaction and are cylindrically hollow. A gamma-emitting source is placed on a probe and mounted for vertical excursion inside a selected emulated hollow fuel rod. A detector, typically a Geiger-Muller counter, is placed for corresponding vertical excursion inside another and preferably adjacent fuel rod. Gamma radiation from the source to the detector through the walls of the emulated fuel rods is measured. Preferably, both detector and source are collimated so that the detector does not receive gamma ray scattering from the interior of the test assembly. Preferably the detector is both collimated as to the gamma rays emitted by the source and cooled by an overlying heavy metal shield, this shield conducting heat from the vicinity of the detector to a water-cooled line passing through the metal shield. By utilizing a relatively low energy neutron source, the gamma signal at the detector can be directly attributed to gamma absorption of the liquid moderator fraction present between the emulated fuel rod containing the detector and the emulated fuel rod containing the source.

7 Claims, 5 Drawing Sheets

METHOD AND APPARATUS FOR MEASURING SUBCHANNEL VOIDS IN A LIGHT WATER REACTOR TEST FUEL ASSEMBLY

BACKGROUND OF THE INVENTION

This invention relates to nuclear fuel bundles and the testing of nuclear fuel bundles in emulated fuel bundle assemblies. More specifically, an apparatus and process is disclosed for testing the moderator void fraction present between two adjacent and emulated fuel or water rods within a fuel bundle test assembly.

STATEMENT OF THE PROBLEM

Test loops for emulating the performance of a boiling water nuclear reactor are known. Typically, these loops are provided with electrically heated, simulator fuel rods. These fuel rods are arrayed in the same fashion as the individual fuel rods are arrayed in the interior of a nuclear reactor fuel bundle. The electrically heated individual fuel rods emulate the thermal performance of the regularly heated nuclear fuel rods containing nuclear fuel pellets undergoing fission reaction. Electric current is typically applied to the individual test fuel rods to heat the rods in a manner that is precisely analogous to the heating that would be applied by the nuclear fuel in the presence of moderated neutrons.

Such test assemblies (bundles) are mounted in a so-called "test loop." The test loop supplies water moderator at the temperature, pressure and flow rate that are encountered in a nuclear reactor. Such water moderator is supplied to the bottom of a vessel containing the nuclear fuel bundle test assembly, where it attains boiling conditions as it flows between the electrically heated fuel rods. When water is circulated from the bottom of such a test vessel out through the top of such a test vessel, the actual operation of a nuclear fuel bundle within a boiling water nuclear reactor can be closely emulated.

Boiling water reactors are comprised of elongate assemblies of individual fuel rods standing in a matrix in an upright position. Such matrices vary in density from 8×8 arrays to 9×9 arrays to 10×10 arrays presently.

In the lower portion of such nuclear fuel bundles, only the liquid water moderator is present. In the upper portion of such nuclear fuel bundles, a combination of liquid moderator and steam is present. As the water passes through the fuel bundle from the bottom to the top, an increasing fraction of the passing water is in the form of steam. Consequently, it is said that the upper portions of such bundles have an increasing "void fraction" within the fuel bundle. That is to say, fuel bundles have increasing concentrations of steam and decreasing concentrations of liquid as the water moderator passes upwardly along their length.

Boiling water nuclear reactors are dependent upon this void fraction in their operation. This dependency occurs as a result of two discrete phenomena.

First, the reactors require that the individual fuel rods effect efficient and so-called "nucleate" boiling of the water. This nucleate boiling is necessary not only for the generation of steam, but also for insuring that the individual fuel rods are not damaged by overheating. During the nuclear reaction, the sealed individual fuel rods of the fuel bundle constitute heated pressure vessels for the retention of their contained radioactive materials. If the individual fuel rods are not maintained in a cooled state, overheating of the fuel rods can cause damage to the exterior of the individual fuel rods. The onset of this overheat is commonly known as "boiling transition or dryout" and is characterized by an increase in temperature at the boiling surface. Naturally in efficient and safe nuclear design and operation, the avoidance of the onset of boiling transition is highly desirable.

Secondly, boiling water nuclear reactors are dependent on the amount of moderation present to maintain the desired nuclear reaction. Simply stated, the fission reaction in such boiling water nuclear reactors generates fast-moving or high speed neutrons. In order for these fast-moving or high-speed neutrons to take part in the continuing and desired fission reaction, the neutrons must be slowed or "moderated" to the thermal state. Such slowing occurs in the water moderator and is dependent upon the density of hydrogen atoms of the moderator. Since the density of hydrogen atoms at BWR condition is about twenty times greater for the liquid than for the steam vapor phase, it is vital to know and understand the liquid fraction that is present at all parts of a fuel bundle.

SUMMARY OF THE PRIOR ART

Test assemblies utilizing electric heating to emulate the performance of all or a portion of a nuclear fuel bundle undergoing nuclear reaction are known. These test assemblies usually include a plurality of hollow emulated fuel rods. These hollow or emulated fuel rods are given a diameter analogous to the diameter of the fuel rods being emulated. Current is applied across the rods to generate heat at the same rate that a nuclear reaction, interior of the real fuel rods, would generate heat.

Such fuel rods are installed within a test loop. The test loop emulates the pressure and temperature conditions found within a nuclear reactor. Specifically, heated water is introduced at bottom of such emulated fuel bundles. Water and steam is extracted from the top of such emulated fuel bundles. Flow is maintained through the fuel bundles in precise analogy to that encountered within the nuclear reactor.

Typically, and because nuclear reactors operate under high temperatures and pressures (usually 1,000 pounds per square inch of pressure at 525° F. inlet), such test assemblies are placed within a substantial containment vessel. This vessel contains the moderator under the desired pressure, temperature and flow conditions. At the same time, all access for the measurement of moderator must be obtained through the containment vessel.

It has been known in the past to measure void fractions across all or a substantial portion of a nuclear fuel bundle in such test assemblies. Usually, a group of emulated fuel rods comprising less than a full fuel bundle and on the order of one-quarter of a fuel bundle is utilized. This partial bundle of fuel rods is enclosed within a test loop that maintains within a pressure vessel the full temperature, pressure and flow conditions that can be encountered within the boiling water nuclear reactor.

Measurement of the void fraction has occurred in the past through the walls of the containment vessel. Such measurement occurs from one side of all of the emulated fuel rods within the containment vessel to the other side of all of the fuel rods within the containment vessel. Specifically installed "windows" of low material density are required to enable this testing to occur.

Further, and when there is an emulated channel box in place surrounding the fuel bundle test assembly, it is necessary also to provide the channel box in the test assembly with corresponding windows. These corresponding windows in the emulating channel box are registered to the window in the containment vessel.

In the past, a gamma emitter has been utilized for the measurement of void fractions across such test assemblies. Because of the thickness of such test assemblies, the gamma source chosen is required to have sufficient emission energy to pass through the vessel windows, the channel box windows and across the full width of the assembly being tested. At the other side, the gamma signal must pass through the opposite channel box windows and the pressure vessel windows. In such passage, the variation in the attenuation of the gamma rays is relied upon to indicate the presence or absence of water moderator in the path between source and detector.

Unfortunately, and with such an across the test assembly gamma ray penetration, it is not always possible to determine with precision where the attenuation of the gamma rays originates. First, the interrogating gamma radiation must traverse relatively long distances. Second, the fuel rods in such assemblies (and indeed in all nuclear fuel assemblies) do not achieve perfect vertical alignment in their row and column orientation. It is known that some fuel rods wander out of alignment relative to the remaining fuel rods. As a result, the attenuation of the interrogating gamma rays for the determination of void fraction can encounter many variations from passage across the test assembly that are due to factors other than the presence or absence of moderator.

Finally, and assuming that the attenuation of moderator in such assemblies is due solely to moderator present, there is a difficulty in determining where the moderator resides that causes the attenuation. For example, it is well known that liquid moderator coats the inside of the channel box walls within a nuclear fuel bundle. Unfortunately, and in a scan completely across a nuclear fuel bundle, discrimination of that fraction of moderator adjacent the channel wall from that fraction of moderator at other portions of the bundle is generally not possible. Further, it will be remembered that in a boiling water reactor, moderator fraction resident in the fuel bundle changes both with respect to the power level and the particular height of interrogation across the fuel bundle. Heretofore, examination of the fuel bundle at differing heights to determine moderator fraction has not been possible because of the required location of windows to permit access of the gamma radiation.

SUMMARY OF INVENTION

In a test assembly for emulating the performance of a nuclear boiling water reactor fuel bundle, a system of the measurement of subchannel void fraction in the two-phase region of the emulated fuel bundle is disclosed. The emulated fuel bundle has individual emulated nuclear fuel rods typically heated by individual electrical currents instead of nuclear reaction. The interior of the emulated fuel rods are thus cylindrically hollow. A gamma-emitting source, such as americium 241, is placed on a probe and mounted for vertical excursion interior to a selected emulated hollow fuel rods. A detector, typically a Geiger-Müller counter, is placed for corresponding vertical excursion interior to another and preferably adjacent fuel rod. Gamma radiation from the source to the detector through the walls of the emulated fuel rods is measured. Attenuation of the gamma rays between source and detector is used to measure the void fraction within the two-phase region of the emulated fuel bundle. Preferably, both detector and source are collimated so that the detector does not receive gamma ray scattering from the interior of the test assembly. Preferably the detector is both collimated as to the gamma rays emitted by the source and cooled by an overlying heavy metal shield, such as gold, this shield conducting heat from the vicinity of the detector to a water-cooled line passing through the metal shield. By the expedient of utilizing a relatively low energy neutron source—such as americium 241 with its 60 KeV gamma ray emission—gamma signal at the detector can be directly attributed to gamma absorption of the liquid moderator fraction present between the emulated fuel rod containing the detector and the emulated fuel rod containing the source. Utilizing the disclosed test assembly, an accurate measurement of the presence of moderator within a fuel bundle can be determined.

OTHER OBJECTS, FEATURES AND ADVANTAGES

An object to this invention is to disclose a measurement technique for determining the density of moderator between discrete emulated fuel rods within a fuel bundle test assembly. According to this aspect of the invention, a radioactive source is chosen having a moderate gamma ray emission. For example, a source including americium 241 includes a decay emitted 60 KeV gamma ray. Typically the gamma ray source is mounted within an electrically heated emulated nuclear fuel rod. A Geiger-Müller counter is placed interior of an adjacent discrete test fuel rod, both such rods being disposed within the nuclear fuel bundle test assembly. Preferably both the source and detector are surrounded with collimation shielding with the result that the receipt of scattered gamma ray radiation at the detector is minimized. As the power level in the test fuel bundle is changed, the attenuation of gamma radiation between the source and detector can be used to determine the moderator void fraction present between the individually monitored and emulated fuel rods.

An advantage of this aspect of the invention is that measurement is made directly between discrete and adjacent fuel rods within the nuclear fuel bundle test assembly. As a consequence, the absence or presence of moderator is a direct effect of the void fraction in the moderator adjoining the path between the two adjacent fuel rods. Other fractions of moderator—such as those known to be present adjacent the channel box walls of the emulated fuel bundle—are not measured by the disclosed technique.

An additional advantage of this invention is that a relatively low-energy gamma source can be utilized. This low-energy gamma at the gamma source—americium 241 with its decay gamma emission of 60 KeV—has an ideal intensity for measurement of the changes in moderator fraction across two immediately adjacent emulated fuel rods. As a consequence, a higher intensity gamma source having energy to effect measurement across the entire width of a fuel bundle assembly, is not required.

An additional object to this invention is to disclose an embodiment of the Geiger-Müller detector which can tolerate the relatively high heat environment of an emulated fuel rod within a nuclear fuel bundle test assembly.

According to this aspect of the invention, the Geiger-Müller detector is surrounded by a gold collimating shield. This shield in turn is communicated to a cooling water source. The interstitial volume between the counter and shield on one hand, and the inside diameter of the emulated fuel rod on the other hand, is surrounded by a thermal insulator, preferably a ceramic paper. During measurement, a continuous flow of cooling water passes around the Geiger-Müller counter shielding. Protected by the disclosed insulation, shielding and coolant water flow, a detector assembly that can operate within the high temperature environment of the emulated fuel rod assembly is disclosed.

An advantage of the invention is that both the americium 241 source and the Geiger-Müller counter are small. Accordingly the disclosed assembly can easily fit within the increasingly small fuel rod diameters utilized in modern nuclear fuel bundles. For example, individual fuel rods in 10×10 fuel rod arrays typically have an interior diameter of 0.36 inch. The disclosed source and detector assemblies can easily fit within such a dimension.

An additional advantage of this invention is that no longer must measurement be made through the wall of a vessel containing the fuel bundle test assembly. Instead the measurement can be effected by direct insertion of the detector and probe from below the assembly. Direct access to the test fuel rod site to be examined for moderator is provided.

An additional object to the disclosed invention is to enable vertical excursion of both source and detector in a nuclear fuel bundle test assembly. According to this aspect of the invention, a common carriage is provided for the vertical excursion along a path immediately underlying the fuel bundle test assembly. The fuel bundle test assembly is constructed so as to provide downward exposed openings in each of the individual emulated fuel rods forming the construction of the fuel bundle test assembly. Typically, the radioactive source is registered to and inserted in one emulated fuel rod. One or more detectors is registered to and inserted in one or more adjacent emulated fuel rods. The source and detectors are moved in elevation interior of their respective fuel rods, simultaneously. Utilizing this movement in elevation, readings can be taken at all effective elevations in the two-phase region of the emulated fuel bundle. As a result there is disclosed for the first time a method and apparatus for determining void fractions at all elevations within the fuel bundle.

BRIEF DESCRIPTION OF THE DRAWINGS

Other objects, features and advantages of this invention will be more apparent after referring to the following specification and attached drawings in which.

DESCRIPTION OF THE PREFERRED EMBODIMENT

Figure 1:
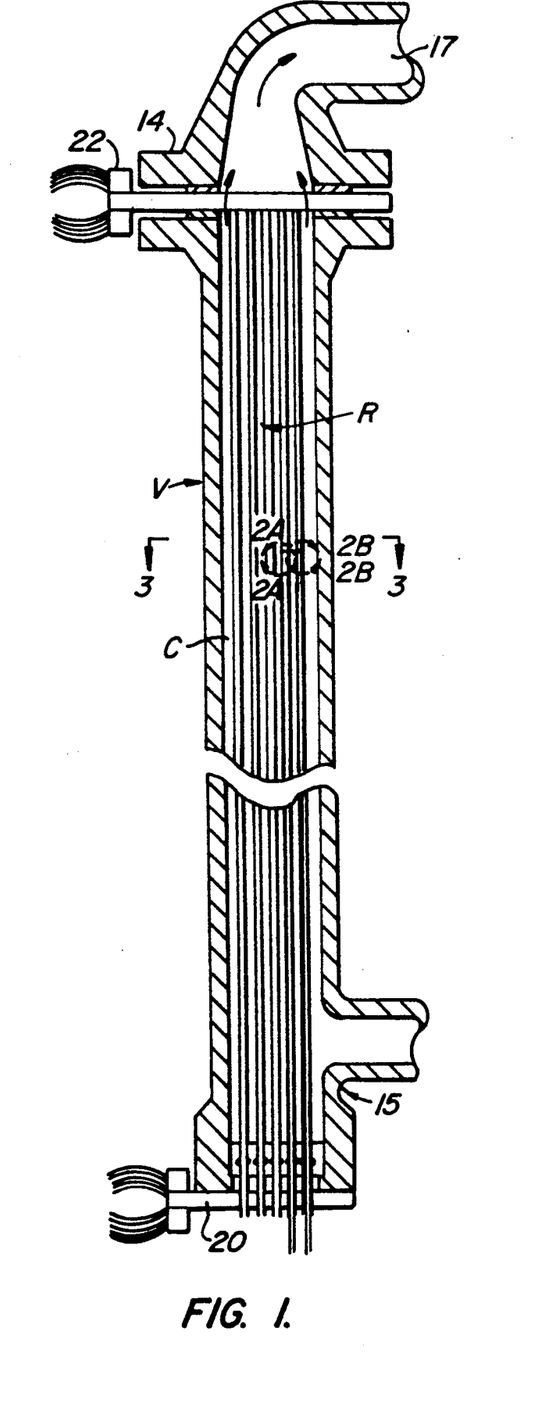
FIG. 1 is the side elevation section of a schematic of a test loop for testing the performance of a fuel bundle, the loop here illustrating a test unit capable of testing a full fuel bundle including a fuel channel.

Referring to FIG. 1, a vessel V is shown mounted between an upper flange assembly 14 and a lower water-inlet assembly 15. Interior of the vessel V there is mounted a channel C having a plurality of fuel rods R. The fuel rods R all extend between a ground bus 20 and an electrically hot bus 22. Individually, each of the fuel rods R is provided with electrical current.

In operation, water flow through the vessel V and individual electric current to each of the rods R is varied. Such variation occurs to emulate in the test assembly the same conditions that occur within a nuclear fuel bundle. For example, at inlet 15 to vessel V, water flows inwardly at $\approx 1000$ psia pressure and at 525° F. Similarly and outwardly through the top of the pressure vessel V at 17, water and steam flow out. By changing the respective current rates on each of the individual rods R emulation of fuel bundle at all powering rates can occur.

Figure 2A:
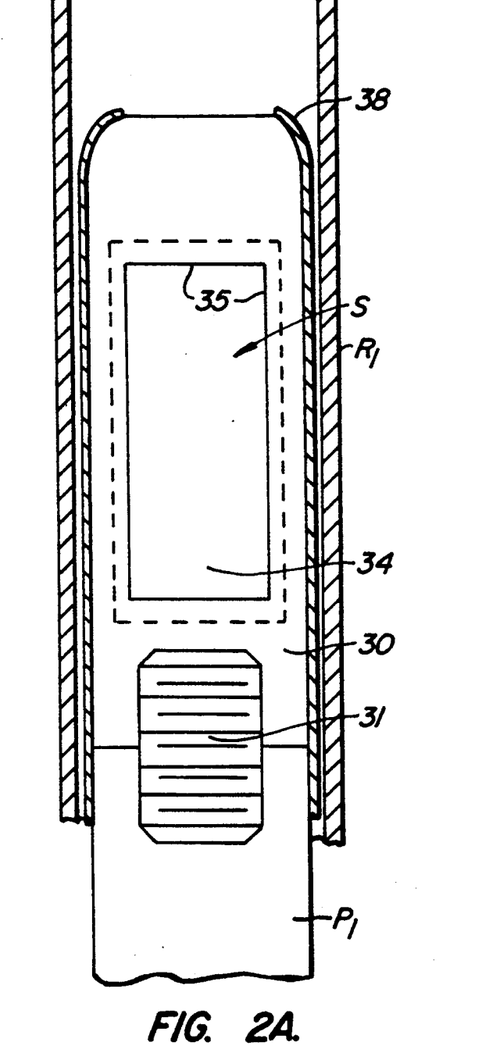
FIG. 2A is a side elevation section detail of a gamma ray source, the source shown being an aligned source of americium 241 surrounded by a gold layer for effecting collimation of gamma rays emitted at the source.

Referring to FIG. 2a, an enlarged detail of FIG. 1 is illustrated taken along lines 2a—2a of FIG. 1. Specifically, the end of a probe P1 is disclosed. Probe P1 has mounted on top thereof a source capsule 30, the mounting here occurring through a threaded connection schematically illustrated at 31. Approximately 10 mCi activity of americium 241 is arrayed within the source mounting 30. Typically the americium 241 is arrayed as a line source shown at 34 and is surrounded by peripheral shielding at 35 so as to expose a rectangular window. A material sufficient for both shielding and withstanding temperatures has been found to be gold.

It will be remembered that the perimeters of the respective rods, here rod R1, are under a considerable electrical potential. This being the case, the entire assembly is enclosed within an insulating layer of Teflon 38. Preferably the entire test assembly is maintained at ground potential through a conductor of suitable electrical resistance.

Figure 2B:
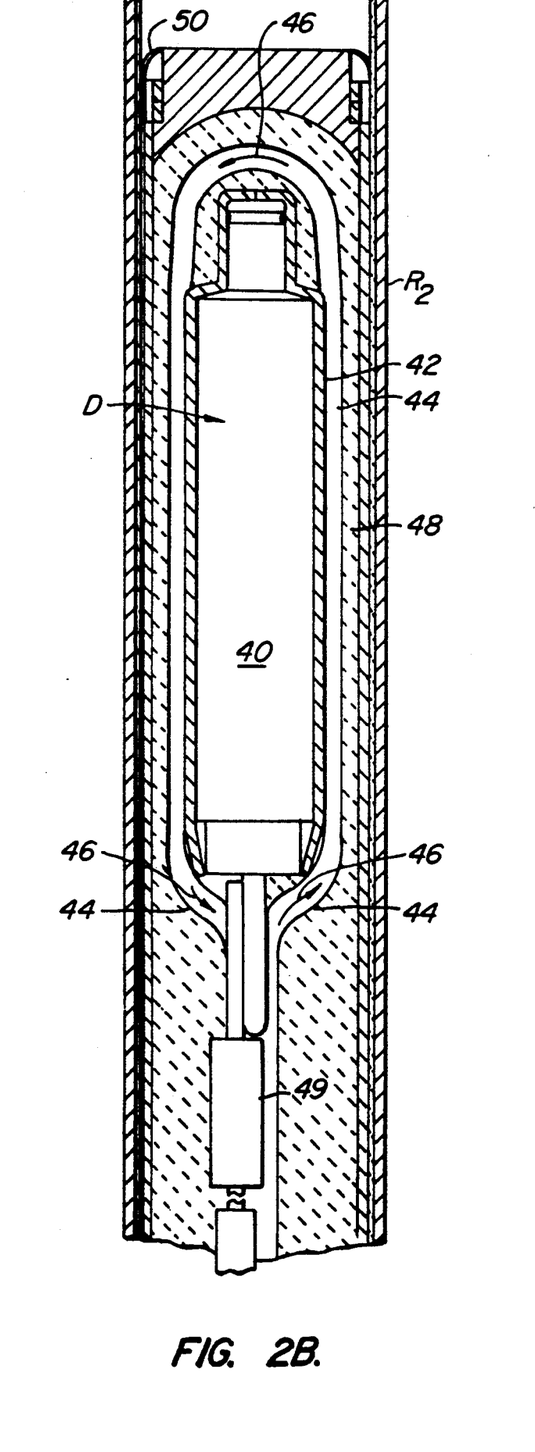
FIG. 2B is a side elevation section of a Geiger-Müller tube illustrating the tube surrounded by shielding for conducting the heat away from the detector assembly as well as collimating the received gamma radiation.
Figure 2C:
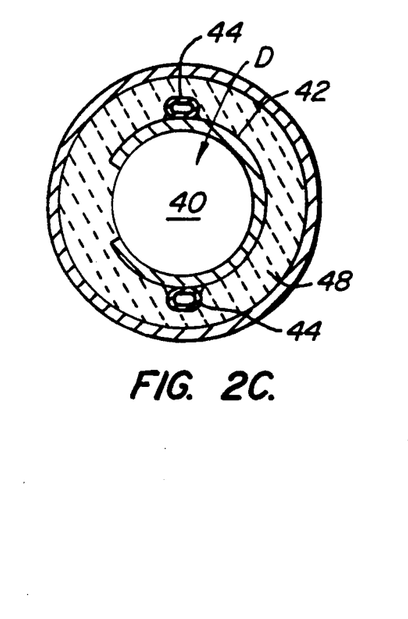
FIG. 2C is a plan section of the Geiger-Müller tube of FIG. 2B taken medially of the tube illustrating the termination of the collimator and cooling fin.

Referring to FIG. 2b, the detector D of this invention is illustrated. A state of the art Geiger-Müller tube 40 is mounted centrally of the detector. This Geiger-Müller tube is surrounded by thermally conductive shielding 42 which effectively collimates gamma radiation received interior of the Geiger-Müller tube 40. The shielding is, in turn, surrounded by a cooling water tube 44 which supplies a continuing flow of water as indicated by arrows 46. Gold is used for the disclosed shielding; it can effect collimation of the gamma radiation and conduction of heat.

Exterior of the Geiger-Müller tube there is provided an insulation layer. A preferred layer of thermal insulation 48 has been found to be ceramic paper. Such a paper insulation is sold by the Cotronics Corporation of Brooklyn, N.Y., under the catalog designation 300-020. (It will be understood that the purpose of the ceramic paper insulation and water cooling is to insure that the gold shield, and the detector inside it, remain cool.)

Figure 4:
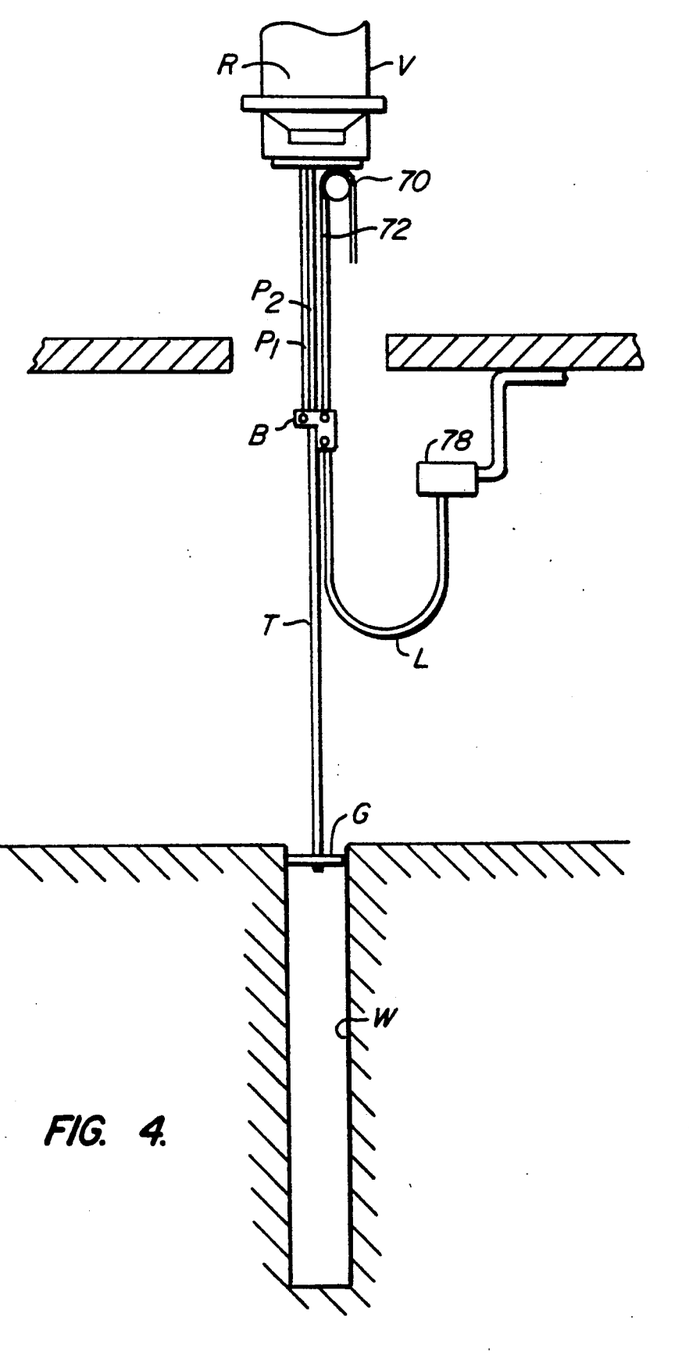
FIG. 4 illustrates an assembly below the fuel bundle test assembly for raising and lowering the source and detector in selected tubes of the fuel bundle assembly being tested; and, FIG. 5 illustrates the lower end of the detector probe and its construction for accommodating variable expansion of the detector probe as insertion changes within the nuclear fuel bundle test assembly.

Geiger-Müller counter 40 is of standard construction; typically, it is connected via an anode resistor 49 to a coaxial cable, to the preamplifier 78, FIG. 4, the monitor being a standard state of the art monitor which will not be further described herein. (The monitor is not in or near the probe. It is remotely located.)

Precisely analogous to the case of the source, the entire detector assembly is surrounded by a layer of Teflon insulation 50. As it will be remembered that the heater tube includes electric potential, such insulation is required.

It will be known to the reader that the individual fuel rod through which observation takes place, here the rod R2, can also be provided with insulation. Typically such tubes include ceramic insulation in the interior thereof. It will be appreciated that any breakdown in this insulation will expose a high electrical potential.

Accordingly, it is customary to maintain both source and detector probes at ground potential through a conductor of suitable electrical resistance. In the event that any potential is read, it is presumed that insulation breakdown has occurred. Removal and repair of the source and detector is immediately made to prevent electrical potential from two locations burning out or otherwise destroying the source and detector.

Figure 3:
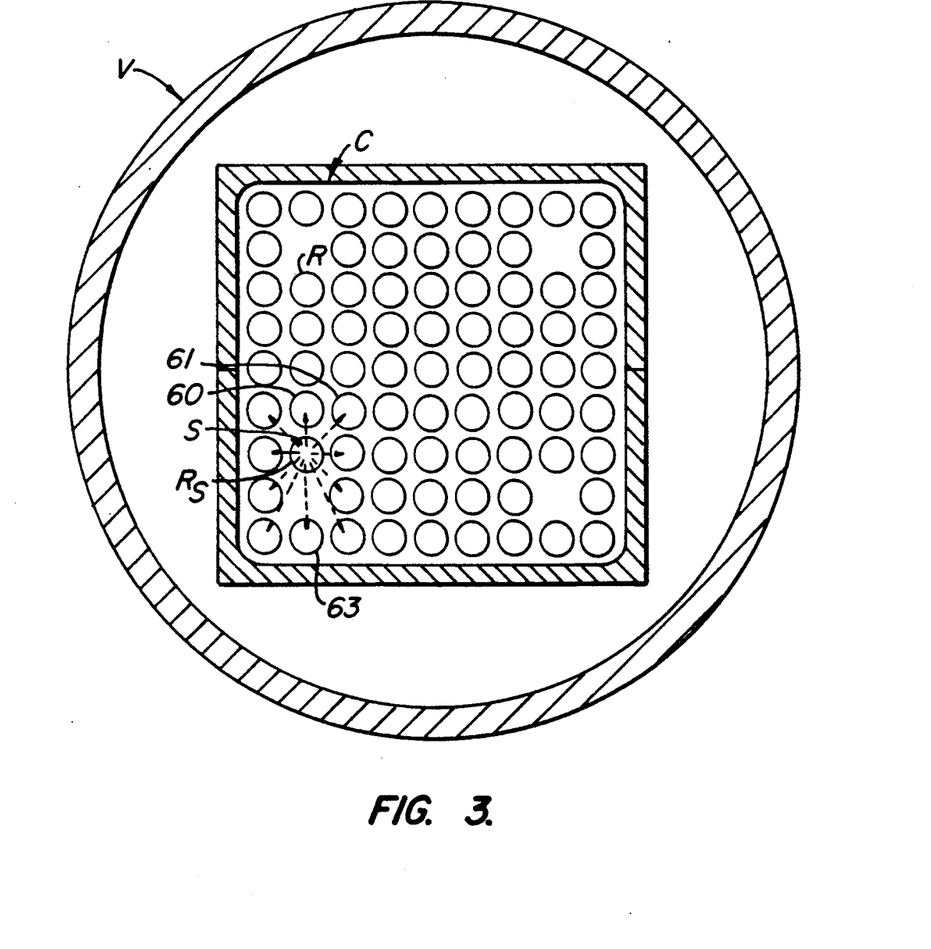
FIG. 3 is a plan section of the test assembly taken along lines 3—3 of FIG. 1 illustrating an exemplary moderator density measurement that can be taken.

Referring to FIG. 3, a fuel bundle having an exemplary fuel rod array is illustrated. The vessel V of FIG. 1 is illustration at the section 3—3. The assembly includes an individual channel C and numerous rods R.

Assuming that the americium source S is passed interior of a rod $R_s$ possible placements of the detector for measurement are shown. For example, such placements of the detector can include an immediately adjacent rod 60, a diagonally adjacent rod 61 or other selected fuel rods. Further, measurement to and across gaps created by so-called partial length rods can be made. By way of example, it can be seen that source S can measure the moderator fraction along a path directly overlying the top of a partial length (not shown in the view here illustrated), to rod 63.

It will likewise be appreciated that both a probe carrying the source and a probe carrying the detector can be registered to any of the numerous rods illustrated in the view of FIG. 3.

For purposes of this application, only one probe and one detector have been illustrated. It will be understood that multiple probes and multiple detectors can be utilized.

Referring to FIG. 4, the lower end of the vessel V is shown. It will be remembered that each of the respective rods R is downwardly exposed to and towards the bottom of the disclosed fuel bundle test assembly.

A probe base B is shown. Base B is arranged for vertical excursion on a track T having a guide G fitted within a well bore W. A motor including a chain 72 and sprocket drive 70 raises and lowers the probe base B. To the probe base B, there are fixed probe P1 mounting the source and probe P2 mounting the detector.

In order to assure communication of the detector to both monitoring instrumentation and a source of coolant, depending lines L connect the base B and an instrumentation preamplifier 78. Conduit to test instrumentation (not shown) extends from the preamplifier.

Figure 5:
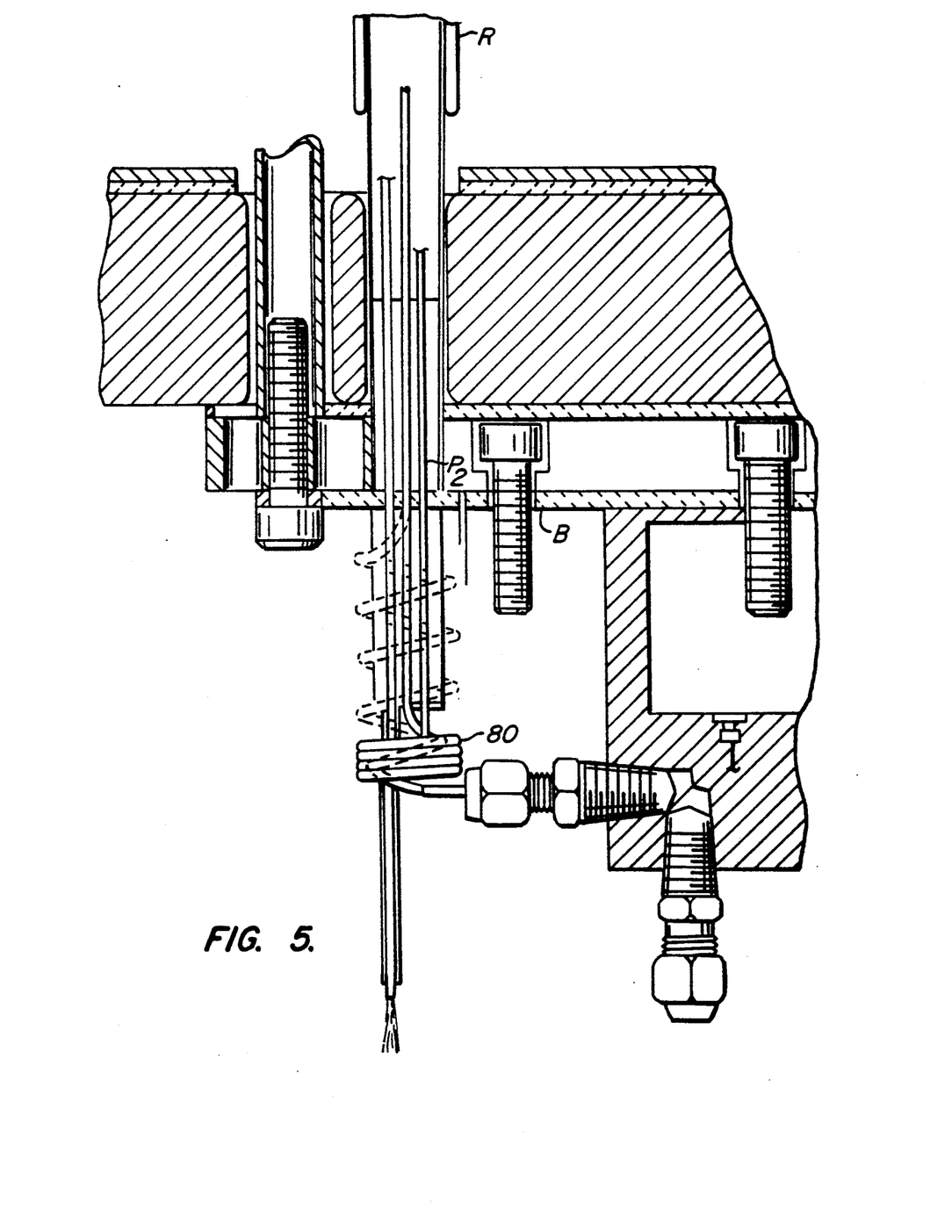

It will be understood, that as probe P2 effects varying degrees of penetration within any of the rods R of the nuclear fuel bundle test assembly, differential expansion of the probe will occur. Accordingly, and to accommodate this expansion, the inlet cooling water is fed from a coil 80, which coil 80 expands and contracts corresponding to the variable expansion and contraction of the probe P2 upon its penetration and elevation interior of the rod R in which detection is occurring. Accordingly, base B is provided with a probe coil of extra length which coil can extend differentially the length of the probe. Discharge occurs by means of a simple tube spraying heated coolant downwardly.

Operation of the probe is easy to understand. Specifically, both source and detector are scanned in elevation during steady state operation of the test vessel illustrated in FIG. 1. During such scans, changes in gamma radiation detected are related directly to the moderator void fraction present between adjacent fuel bundles.

It will be appreciated that the disclosed technique is a powerful one. By way of example, the exact distribution of moderator can be determined by modeling. For example by modeling the predicted distribution of moderator and comparing the model to determine experimental results, varying distribution of moderator including the moderator adjacent the channel walls can be determined.

What is claimed is:

1. In combination with a nuclear fuel bundle test assembly having:
   a plurality of upstanding vertical rods, said rods having an outside diameter the same as the outside diameter of fuel rods within a nuclear fuel bundle;
   a lower support plate for supporting said vertical rods and providing current to the lower end of said vertical upstanding rods, said lower support plate exposing the lower open ends of said vertical upstanding rods to enable the entrance and exit of testing probes to the interior of said vertical upstanding rods;
   an upper support plate for maintaining said rods in vertical upstanding relation and providing current to the upper end of said vertical upstanding rods;
   a power source connected across said upper and lower support plates for supplying power to said test assembly to produce heat at said individual upstanding rods;
   a test chamber surrounding said vertical upstanding rods for permitting inflow of water at the bottom of said rods and the outflow of water and steam at the upper end of said vertical upstanding rods to enable said test assembly to emulate a nuclear fuel bundle, the improvement to said nuclear fuel bundle test assembly comprising:
   first and second probes for vertical excursion interior of first and second upstanding vertical rods;
   a gamma ray source mounted to one of said probes, said radioactive source emitting particles attenuated by passage through water;
   a Geiger-Müller detector mounted to the other of said probes, said Geiger-Müller detector for insertion to said electrically heated tube within a nuclear fuel bundle test assembly, said detector comprising:
   a Geiger-Müller counter;
   a conducting and shielding material surrounding said Geiger-Müller counter, said material having a window therein for permitting collimated radiation to be received to said counter;

a source of coolant thermally communicated to said Geiger-Müller counter for cooling said conducting and shielding material;

thermal insulation means for surrounding said Geiger-Müller counter for permitting said counter to pass through and into a heated environment at temperatures below said heated environment; and electrical insulation means for surrounding said Geiger-Müller counter for preventing electrical potential within said electrically heated tube from energizing said detector; and, means for raising and lowering said first and second probes in selected upstanding vertical rods for the measurement of moderator fraction between said upstanding tubes.

2. The combination of claim 1 and wherein said gamma ray source is collimated.

3. The combination of claim 1 and wherein said probes raise and lower said respective source and detector at the same elevation within said nuclear fuel bundle test assembly.

4. In combination with a nuclear fuel test bundle assembly having:

a plurality of hollow, electrically heated tubes, said tubes each having an outside diameter equal to the outside diameter of actual fuel rods within an actual nuclear fuel bundle assembly;

a vessel for containing said plurality of hollow electrically heated tubes, said vessel permitting the inflow of water at the bottom and the outflow of water and steam at the top to emulate an actual nuclear fuel bundle in the generation of steam from water during the upward passage of water within said fuel bundle, a process for the measurement of the liquid fraction between said individual rods comprising the steps of:

providing a gamma ray source, said source emitting gamma rays having sufficient energy for passage through said tube walls, and across the water between said tubes to enable water between said tubes to attenuate emitted radiation in proportion to the liquid fraction present between said tubes;

providing a Geiger-Müller detector, said detector for receiving and detecting gamma rays emitted from said source and passing through said water;

inserting said source in a first of said tubes;

inserting said detector in a second of said tubes; and providing a conducting and shielding material surrounding said Geiger-Müller detector;

defining in said conducting and shielding material a window therein for permitting collimated radiation to be received to said counter;

communicating a source of coolant thermally to said Geiger-Müller counter for cooling said conducting and shielding material;

providing thermal insulation means for surrounding said Geiger-Müller counter for permitting said counter to pass through and into a heated environment at temperatures below said heated environment; and providing electrical insulation means for surrounding said Geiger-Müller counter for preventing electrical potential within said electrically heated tube from energizing said detector; and, measuring said gamma rays from said source to said detector to determine the water fraction between said tubes.

5. The process of claim 4 and wherein said inserting step includes:

inserting and elevating said source and detector to determine the water fraction between said tubes at all elevations in said vertical upstanding electrically heated rods.

6. The process of claim 5 and wherein said inserting and elevating step includes:

inserting and elevating said source and said detector to the same elevation.

7. The process of claim 4 and wherein said source and detector are inserted within said tubes to the same elevation.

* * * * *